(12) United States Patent
Williard et al.

(10) Patent No.: US 11,286,752 B2
(45) Date of Patent: Mar. 29, 2022

(54) IN-SITU EVALUATION OF GAUGES

(71) Applicant: Schlumberger Technology Corporation, Sugar Land, TX (US)

(72) Inventors: Nicholas Williard, Houston, TX (US); Mihitha Nutakki, Houston, TX (US); Ahmed Fikri Ali Mosallam, Clamart (FR); Daniel Viassolo, Katy, TX (US); Laurent Cotelle, Clamart (FR); Marco Alioto, Clamart (FR); Lucile Baur, Clamart (FR)

(73) Assignee: Schlumberger Techology Corporation, Sugar Land, TX (US)

( * ) Notice: Subject to any disclaimer, the term of this patent is extended or adjusted under 35 U.S.C. 154(b) by 786 days.

(21) Appl. No.: 16/100,582

(22) Filed: Aug. 10, 2018

(65) Prior Publication Data
US 2020/0048992 A1 Feb. 13, 2020

(51) Int. Cl.
| | |
|---|---|
| *E21B 41/00* | (2006.01) |
| *E21B 47/00* | (2012.01) |
| *G01K 15/00* | (2006.01) |
| *G01L 27/00* | (2006.01) |
| *G06N 5/00* | (2006.01) |
| *G06F 7/02* | (2006.01) |
| *G06N 20/00* | (2019.01) |
| *G06N 20/10* | (2019.01) |
| *G01V 13/00* | (2006.01) |
| *G06Q 10/06* | (2012.01) |

(52) U.S. Cl.
CPC .......... *E21B 41/0092* (2013.01); *E21B 47/00* (2013.01); *G01K 15/005* (2013.01); *G01L 27/002* (2013.01); *G01L 27/005* (2013.01); *G01V 13/00* (2013.01); *G06F 7/023* (2013.01); *G06N 5/00* (2013.01); *G06N 20/00* (2019.01); *G06N 20/10* (2019.01); *G06Q 10/0637* (2013.01); *E21B 2200/20* (2020.05); *E21B 2200/22* (2020.05)

(58) Field of Classification Search
CPC .. E21B 2200/20; E21B 41/0092; E21B 47/00; G01K 15/005; G01L 27/002; G01L 27/005; G01V 13/00; G06F 7/023; G06N 20/00; G06N 20/10; G06N 5/00; G06Q 10/0637
See application file for complete search history.

(56) References Cited

U.S. PATENT DOCUMENTS

| | | | |
|---|---|---|---|
| 7,346,469 B2 | 3/2008 | Taware et al. | |
| 2016/0178435 A1* | 6/2016 | Indo | G01J 3/0218 356/326 |
| 2019/0129063 A1* | 5/2019 | Youssef | G01V 13/00 |

FOREIGN PATENT DOCUMENTS

WO  WO 2014/152975   * 9/2014

* cited by examiner

*Primary Examiner* — Catherine T. Rastovski
(74) *Attorney, Agent, or Firm* — Rodney Warfford

(57) ABSTRACT

Methods for evaluating sensor data to predict when the sensor should be recalibrated are described. The methods include a model that utilizes current wellbore data as input for the recalibration prediction.

21 Claims, 3 Drawing Sheets

IN-SITU EVALUATION OF GAUGES

FIELD OF THE DISCLOSURE

The disclosure relates to methods for evaluating sensor data. Specifically, the methods relate to the determination of when downhole gauges should be recalibrated due to sensor draft.

BACKGROUND OF THE DISCLOSURE

The control of the production of hydrocarbon wells includes many competing issues and interests including economic efficiency, recapture of investment, safety and environmental preservation. Production levels depend on reservoir formation characteristics such as pressure, porosity, permeability, temperature and physical layout of the reservoir and also the nature of the hydrocarbon (or other material) extracted from the formation. As such, the producing well must be monitored and controlled to maximize the production of hydrocarbons over time and to prevent catastrophic mishaps.

Measurements such as pressure measurements in producing wells are important to determine how the producing well responds to changes during the production process. The processed data may be used to predict downhole conditions, and make decisions concerning oilfield operations. Such decisions may involve well planning, well targeting, well completions, operating levels, production rates and other operations and/or conditions. Often this information is used to determine when to drill new wells, re-complete existing wells, or alter wellbore production schemes.

Sensors to take measurements, such as pressure, can be placed at the surface (i.e. at the wellhead) or deployed in the wellbores in a downhole tool, such as a gauge. Sensors in the wellbore are exposed to high temperature and pressure environments and, depending on what materials the sensors are made of, will respond differently to its environment. As every sensor will undergo some expansion and contraction when subjected to the pressure and temperature cycles experienced in the reservoir, the sensor will drift over time and record inaccurate measurements.

The magnitude a sensor will drift varies with actual usage and the conditions the sensor is exposed to, as well as the gradual degradation of the sensor itself. As such, most operators will take downhole gauges out of service at a specific interval of time, test the sensors for drift, and recalibrate the sensors, if needed, to ensure accurate pressure readings during production. Such procedure slows production, as most gauges that are taken out of service and tested do not need calibration. Further, the tests do not predict when a sensor may need to be retested for drift. Thus, the operator runs the risks that inaccurate pressure readings will be acquired before the next drift-testing interval will be used to monitor the production.

Thus, what is needed are methods of improving the monitoring of sensor drift, including improved utilization of a sensor's entire useful, accurate life and minimizing down time for drift calibrations.

SUMMARY OF THE DISCLOSURE

The present disclosure includes any of the following embodiments in any combination(s) of one or more thereof:

An embodiment of the present disclosure provides a method for determining when to calibrate a wellbore sensor. The method comprises the steps of: modeling drift thresholds for one ore more wellbore sensors; collecting field data from the one or more wellbore sensors; comparing the collected field data to the drift thresholds; and recalibrating the one or more wellbore sensors if the collected field data exceeds the drift thresholds.

Another embodiment of the present disclosure provides a method for determining the draft status of a wellbore sensor. The method comprises the steps of: creating a dynamic model defining drift thresholds for one or more wellbore sensors, the dynamic model created by combining field data collected by the one or more wellbore sensors and laboratory calibration data for the one or more wellbore sensors; inputting field data collected by the one or more wellbore sensors into the dynamic model; comparing the input field data to the defined drift thresholds for the one or more wellbore sensors; updating the dynamic model with the input field data; and calibrating the one or more wellbore sensors if the input field data exceeds the defined drift thresholds.

These together with other aspects, features, and advantages of the present disclosure, along with the various features of novelty, which characterize the invention, are pointed out with particularity in the claims annexed to and forming a part of this disclosure. The above aspects and advantages are neither exhaustive nor individually or jointly critical to the spirit or practice of the disclosure. Other aspects, features, and advantages of the present disclosure will become readily apparent to those skilled in the art from the following detailed description in combination with the accompanying drawings. Accordingly, the drawings and description are to be regarded as illustrative in nature, and not restrictive.

This summary is provided to introduce a selection of concepts that are further described below in the detailed description. This summary is not intended to identify key or essential features of the claimed subject matter, nor is it intended to be used as an aid in limiting the scope of the claimed subject matter.

DESCRIPTION OF EMBODIMENTS OF THE DISCLOSURE

Figure 1:
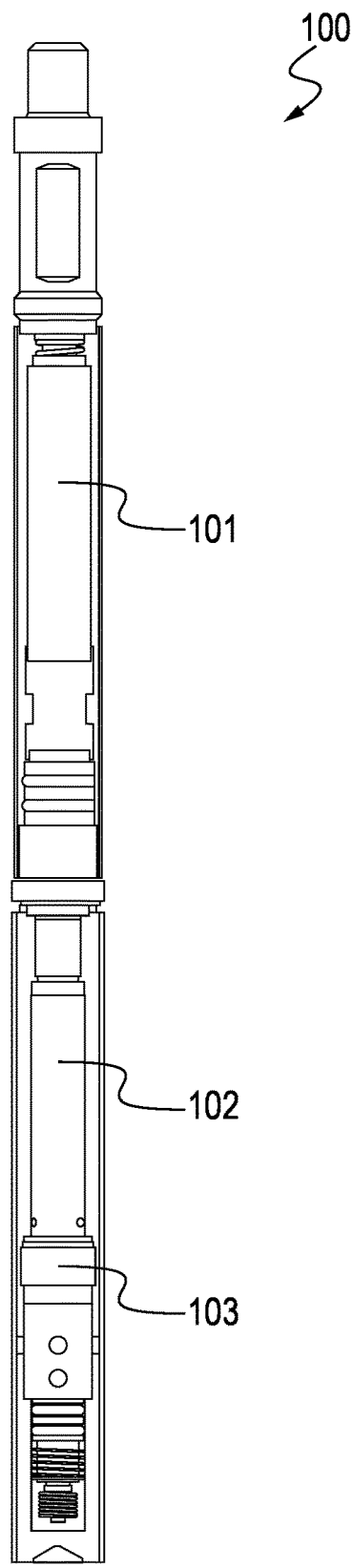
FIG. 1 displays an exemplary wellbore tool used within embodiments of the present disclosure.

In the following description, numerous details are set forth to provide an understanding of some embodiments of the present disclosure. It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. However, it will be understood by those of ordinary skill in the art that the system and/or methodology may be practiced without these details and that numerous variations or modifications from the described embodiments are possible. This description is not to be taken in a limiting sense, but rather made merely for the purpose of describing general principles of the implementations. The scope of the described implementations should be ascertained with reference to the issued claims.

As used herein, the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down"; "upper" and "lower"; "top" and "bottom"; and other like terms indicating relative positions to a given point or element are utilized to more clearly describe some elements. Commonly, these terms relate to a reference point at the surface from which drilling operations are initiated as being the top point and the total depth being the lowest point, wherein the well (e.g., wellbore, borehole) is vertical, horizontal or slanted relative to the surface.

Data collected by one or more sensors in the reservoir may be used for current or future operations. When used for future operations at the same or other locations, such data may be referred to as "historical data", whereas data used for current operations is referred to as "field data". Data collected from the sensors during calibrations performed in a laboratory setting is referred to as "calibration data".

As used herein, the term "ground truth", per its traditional connotation in the field of machine learning, refers to the information provided by direct observation (from e.g. field data) as opposed to information provided by inference. It is used to describe the accuracy of the training set's classification for supervised learning techniques. The term 'ground truth' can be applied to both the historic and current field data.

In general, embodiments of the present disclosure utilize a model that is developed using field data and calibration data specific to the downhole tool to build a predictive relationship for the drift of the downhole tool sensor measurements. Current field data collected by the downhole tool is input to the model to evaluate the condition of the sensor(s) and determine if sensor drift has occurred such that recalibration of the sensors is necessary. The sensor drift is compared to a predetermined critical level, or threshold, of drift. If sensor drift, according to the current field data, has extended beyond the predetermined critical limit, then the model alerts field technicians or operators that recalibration is needed for a downhole tool, such as a gauge. Such downhole tool is then taken out of service, where it can be tested and/or recalibrated. Embodiments of the methodology of the present disclosure thus negate the need to perform service checks on an arbitrary time interval (e.g. annually, every two (2) years, three (3) years, etc.), thus saving time and cost associated with the periodic tests. The downhole tool is used until its sensor measurements drift beyond a critical limit before being pulled from service for recalibration.

In the embodiment described, if the sensor drift has not extended beyond the predetermined critical limit, no alarm is raised. However, the collected field data itself is incorporated into the model, as this data is now historic. As such, this dynamic model is constantly refining its predictive powers and improving the disclosed methods.

In embodiments of the presently disclosed method, each sensor's condition on each tool is determined based on field data alone. This negates the need to acquire additional information or measurements to predict when the sensor drift has become problematic, which further improves time and cost savings.

Embodiments of the present disclosure are exemplified through testing of high temperature quartz gauges. Quartz gauges are downhole tools used to measure reservoir pressure for applications in reservoir testing, exploration, appraisal testing, and the like. High temperature quartz gauges are often used to acquire measurements in extreme environments. To ensure tool measurement accuracy, high temperature quartz pressure gauges are typically taken out of service periodically (e.g. every two (2) years) and tested for sensor drift. If the pressure sensor is found to have drifted beyond a critical limit, then a tool recalibration is required. However, computation of historical data has shown that after testing for pressure drift, the high temperature quartz pressure gauges don't necessarily require recalibration at such periodic intervals. This suggests that the current periodic, time-based service interval may be conservative and the service interval should be based on current conditions. Thus, production time may be wasted by removing sensors from service based on this arbitrary time interval. However, as it is important that pressure gauges do not operate in an uncalibrated state, such arbitrary testing interval continues to be utilized to ensure data accuracy.

It should, however, be understood that the present disclosure is not limited nor specific to high temperature quartz gauges or pressure measurements. Any gauge is amenable to the presently described model, and the methodology can be applied to other measurement tools that require recalibration, such as those for e.g. testing, wireline, drilling and measurements, and the like. The tools can measure variables other than pressure, such as temperature, tool health monitoring data, and the like. Thus, embodiments of the present disclosure can impart time and cost savings over the lifetime of the well by transitioning tools that undergo periodical on-schedule recalibration, or even periodical "service test" to determine if recalibration is necessary, to tools that need "on-condition" recalibration based on field data. The following examples using quartz gauges and pressure measurements are intended to be illustrative only, and not unduly limit the scope of the appended claims.

FIG. 1 displays an exemplary wellbore tool 100 used in the present disclosure. As shown, the wellbore tool 100 is a quartz gauge. The tool 100 has a battery 101, a sensor 103, and electronics 102 for controlling the sensor and collecting and storing field data within the tool 100. Though not shown in detail, it should be noted that the electronics 102 include an on-board computing device that has a memory device and/or logic controller, as well as other features intended to assist in acquiring, processing, saving, and transmitting the measurements taken by the sensor 103.

As discussed above, gauges such as the quartz gauge 100 shown in FIG. 1 are typically taken out of service every two (2) years (or some other arbitrarily set time interval) and tested for sensor drift. Embodiments of the presently disclosed method intend to negate the need for arbitrarily set time limits by development of a model that can be compared with field data to predict when a tool has been de-calibrated and needs to be taken off line for recalibration.

An embodiment of the method, referred to generally as 200, of the present disclosure is described with reference to FIG. 2. For use within the method 200, a recalibration model is developed (step 202). A wellbore tool 100, such as described with reference to FIG. 1, is used to collect and store field data (step 204). The wellbore tool 100 comprises one or more sensors 103 for acquiring and storing field data, such as data based on job environment and health conditions ("EHC Data"). In order for the "raw" acquired field data to be used with the recalibration model, the data must be processed (step 206). In embodiments of the present disclosure the processing of the raw field data may occur within the wellbore tool 100 or by a remote processor that receives the raw data.

Figure 2:
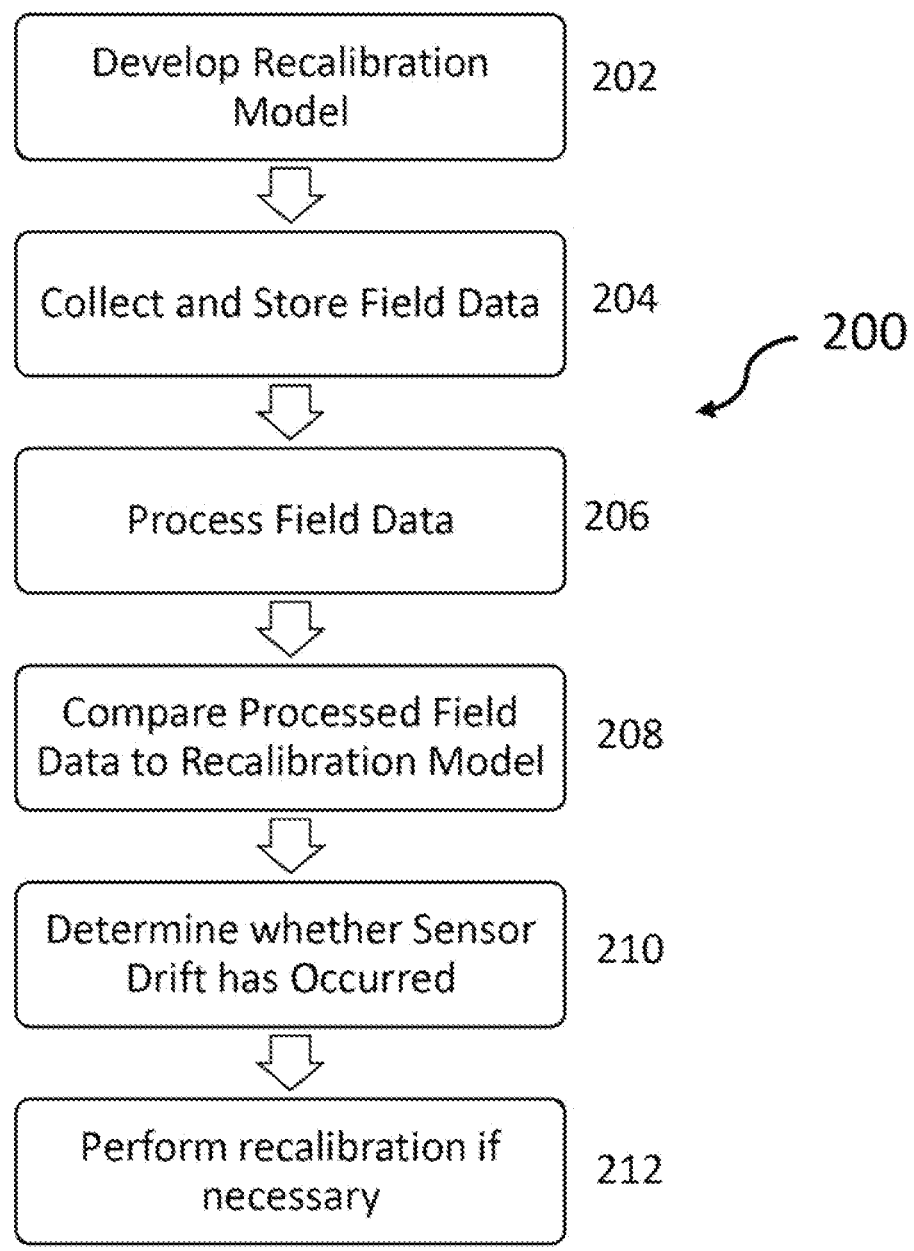
FIG. 2 illustrates an embodiment of the method of the present disclosure.

The next step 208 in the method of the present disclosure illustrated in FIG. 2 is to compare the processed field data to the recalibration model. As will be described herein, the recalibration model includes critical, or threshold, values that indicate acceptable limits of sensor drift. The processed field data is compared to the recalibration model to determine whether sensor drift has occurred (step 210). In other words, if the processed field data falls outside the threshold values, the sensor 103 is considered to have drifted and recalibration is necessary. If so, the final step 212 is to take the tool 100 out of service and perform recalibration if necessary.

Figure 3:
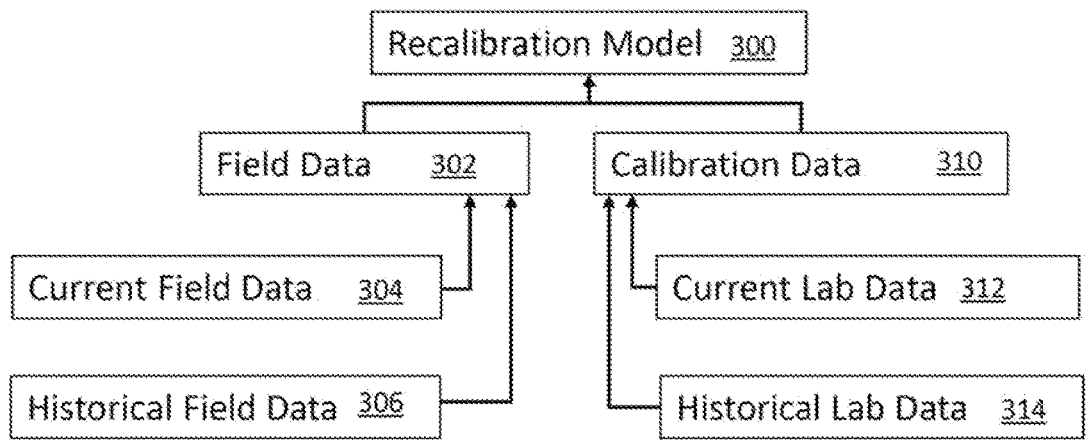
FIG. 3 shows the data used in embodiments of the recalibration model of the present disclosure.

The recalibration model is central to embodiments of the present disclosure. As illustrated in FIG. 3, an embodiment of the calibration model 300 is developed using two (2) datasets. The first dataset is the field data 302 that is collected by the downhole tool 100 during the running of the tool 100, and the second dataset is the calibration data 310 that is collected during laboratory testing of the tool 100.

The field data 302 comprises both current field data 304 and historical field data 306 that is collected by the tool 100 during downhole runs. As discussed above, in embodiments of the present disclosure, the field data 302 is EHC data. The historical field data 306 is typically stored in the tool 100 as part of the tool's operating specifications. The field data 302 is collected by the tool 100 or generated by the tool's on-board processor and can be housed in an on-board memory device or logic controller. At the end of a job or run, the memory of the on-board memory device of the tool 100 is dumped and the data is retrieved and automatically sent to central storage.

For use within the recalibration model 300, the field data 302 is preprocessed to include, but is not limited to, summarization of the field data 302 on a per-run basis such that it contains parameters such as the max temperature measured during the run, max pressure, operating time, number of pressure cycles, number of temperature cycles, and the like. As this field data 302 may be available within the tool 100 and external to the tool 100, the location of the recalibration model 300 and modelling processes in some embodiments may exist within a computational device on the tool 100 or on a computational device external to the tool 100 but which is in communication with the tool 100.

The calibration data 310 is generated by exposing the tool 100 to known pressure conditions and then comparing the tool's pressure measurement to a known measurement and calculating the difference. This testing is performed in a laboratory setting and the results are usually generated as part of a report. The results are used to determine the recalibration status and build the relationship between the field data 302 and the sensor drift.

In embodiments of the present disclosure, the current lab data 312 is saved on the tool's on-board memory, becoming part of the historical lab data 314. The historical lab data 314 is required whenever the recalibration model 300 is initially built or when it is improved upon with more current lab data 312 during additional calibrations or service checks of the tool 100. Input of this calibration data 310 into the recalibration model 300 can be automated such that calibration data 310 is transmitted directly to the recalibration model 300 for incorporation therein.

By combining the field data 302 with the calibration data 310 in the recalibration model 300, a relationship can be created to map the field data 302 to sensor drift data. This relationship can be developed in several ways including, but is not limited to, a regression analysis between the data parameters to the closest measured sensor drift calculation, or a classification algorithm which inputs field data 310 and classifies if the most recent calibration analysis passes or fails. Ideally, the recalibration model 300 will be developed using machine learning regression or classification algorithms so that the system has the ability to "learn" with additional data being collected, without being explicitly programmed. There is a range of regression or classification techniques in the machine learning field including, but not limited to, gradient boosted trees, random forest, or support vector machine. As these techniques are known in the art, they will not be repeated here.

Once the recalibration model 300 is developed, it can be encoded within a software framework. Such software amenable to the method include Matlab, Python, Excel, Numbers from Apple, Apache OpenOffice, LibreOffice and the like. In some embodiments of the present disclosure, the hardware for implementing the modeling may include massively parallel and distributed Linux clusters, which utilize both CPU and GPU architectures. Alternatively, in other embodiments, the hardware may use a LINUX OS, XML universal interface run with supercomputing facilities provided by Linux Networx, including the next-generation Clusterworx Advanced cluster management system. Another system is the Microsoft Windows 7 Enterprise or Ultimate Edition (64-bit, SP1) with Dual quad-core or hex-core processor, 64 GB RAM memory with Fast rotational speed hard disk (10,000-15,000 rpm) or solid state drive (300 GB) with NVIDIA Quadro K5000 graphics card and multiple high resolution monitors. Slower systems could also be used, because the processing is less compute intensive than for example, 3D seismic processing.

Figure 4:
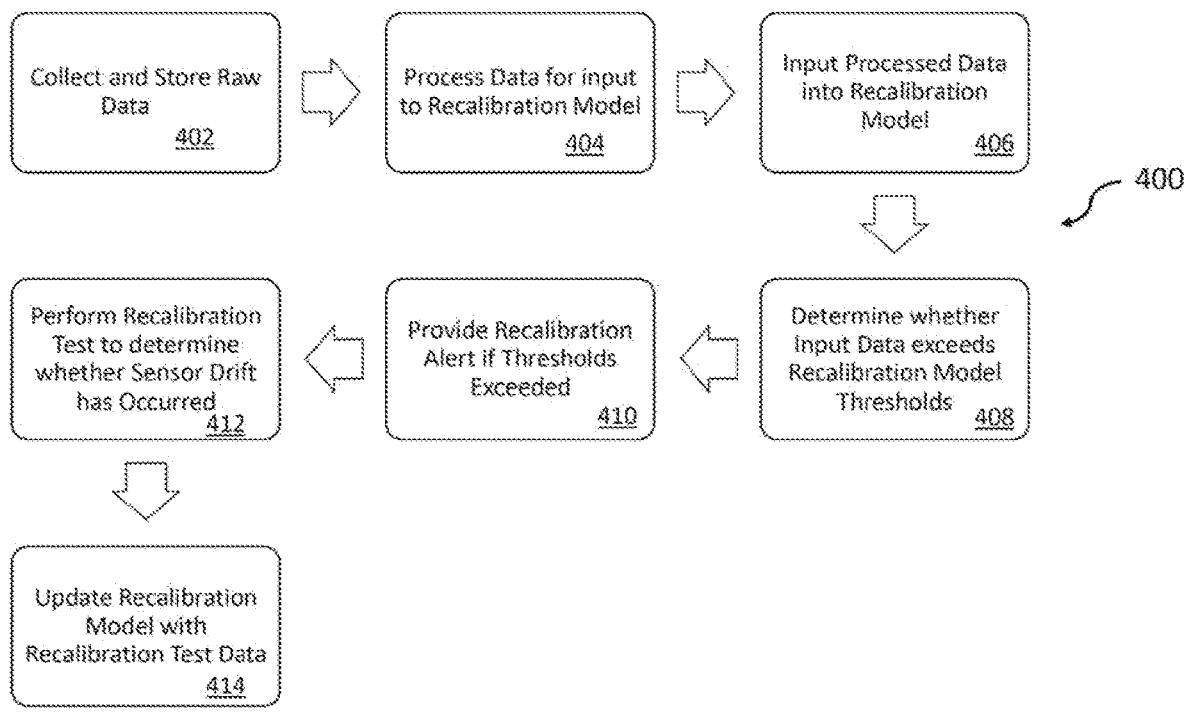
FIG. 4 illustrates another embodiment of the method of the present disclosure.

FIG. 4 illustrates the use of the developed recalibration model 300 in an embodiment of the methodology of the present disclosure, referred to generally as 400. In the embodiment described below, the recalibration model 300 is encoded within a software framework.

Raw field data is first collected and stored (step 402) by the wellbore tool, such as the gauge 100 of FIG. 1. In an embodiment of the present disclosure, the field data is EHC Data. However, it should be understood that the present disclosure is not so limited. In alternate embodiments, the field data can be operational data, or other relevant data for the type of tool being evaluated.

In step 404, the software framework extracts the raw field data from the tool 100 and process the raw data for input to the recalibration model 300. In order to perform the comparative analysis, the raw field data should be in a format suitable for input into the recalibration model 300. Ideally, the processing steps for the collected raw data match the processing steps used for the historical data to obtain a consistent data set. Example data sets include, but are not limited to, the max temperature measured during the run, max pressure, operating time, number of pressure cycles, number of temperature cycles, and the like.

In step 406, the processed field data is input into the recalibration model 300. As discussed with reference to FIG. 3, in embodiments of the present disclosure, the recalibration model 300 includes current and historical field data, as well as current and historical calibration data generated from laboratory testing.

In step 408, the input processed field data is analyzed within the software framework to determine whether the input data exceeds thresholds within the recalibration model 300. The thresholds, or critical drift limits, can be established by either the operator or the manufacturer of the sensors. In alternate embodiments, the thresholds can be determined dynamically through further input into the recalibration model 300.

If it is determined that the sensor has not drifted beyond the critical limits, the tool 100 can continue to be used without further testing. The processed field data is, however, fed to the recalibration model 300 to be used as more ground truth, thus making the recalibration model 300 dynamic and thus more accurate and adaptive to future sensor conditions.

If, on the other hand, it is determined that one or more sensors have drifted past the predetermined critical limits, then in step 410, the software framework provides a recalibration alert to an operator or field technician, for example. The alert can be in the form, but not limited to, notifications within the acquisition software of the wellbore tool 100, alerts in a central dashboard accessed by the operator or field technician, automatic emails, or visual or auditory alarms on a cloud-based software dashboard.

The field technician can then take the tool 100 out of service and perform a recalibration test to identify if significant sensor drift has occurred (step 412). In embodiments of the present disclosure, the recalibration test is performed through laboratory testing. If sensor drift has occurred, the tool is recalibrated and the recalibration model 300 is updated to include the current recalibration laboratory test data. As discussed previously herein, the recalibration model 300 continues to be updated through collection of both field data and calibration data.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded. In the claims, means-plus-function clauses are intended to cover the structures described herein as performing the recited function and not only structural equivalents, but also equivalent structures. It is the express intention of the applicant not to invoke 35 U.S.C. § 112, paragraph 6 for any limitations of any of the claims herein, except for those in which the claim expressly uses the words "means for" together with an associated function.

The invention claimed is:

1. A method for determining when to calibrate a wellbore sensor comprising:
    a) modeling drift thresholds for one or more wellbore sensors, wherein the modeling of the drift thresholds is performed by combining field data and calibration data;
    b) collecting field data from the one or more wellbore sensors;
    c) comparing the collected field data to the drift thresholds; and
    d) recalibrating the one or more wellbore sensors if the collected field data exceeds the drift thresholds.

2. The method of claim 1, wherein the field data comprises currently collected field data and historical field data.

3. The method of claim 1, wherein the calibration data comprises laboratory testing data.

4. The method of claim 1, wherein the one or more wellbore sensors are conveyed as part of a wellbore tool.

5. The method of claim 4, wherein the wellbore tool is a quartz gauge.

6. The method of claim 4, wherein the wellbore tool is a testing, wireline, or drilling tool.

7. The method of claim 1, wherein the field data comprises data based on job environment and health conditions.

8. The method of claim 1, wherein the field data comprises operational measurements.

9. The method of claim 1, wherein the field data comprises pressure measurements.

10. The method of claim 1, wherein the field data comprises temperature measurements.

11. The method of claim 1, further comprising processing the field data collected from the one or more wellbore sensors for comparison to the drift thresholds.

12. The method of claim 1, further comprising providing an alert if the collected field data exceeds the drift thresholds.

13. The method of claim 12, wherein the alert is an automatic email.

14. The method of claim 1, further comprising updating the drift thresholds modeling with the collected field data.

15. The method of claim 1, wherein said modelling drift thresholds uses machine learning techniques.

16. The method of claim 15, wherein said machine learning techniques are selected from a group comprising gradient boosted trees, random forest, and/or support vector machine.

17. A method for determining the drift status of a wellbore sensor comprising:
    a) creating a dynamic model defining drift thresholds for one or more wellbore sensors, the dynamic model created by combining field data collected by the one or more wellbore sensors and laboratory calibration data for the one or more wellbore sensors;
    b) inputting field data collected by the one or more wellbore sensors into the dynamic model;
    c) comparing the input field data to the defined drift thresholds for the one or more wellbore sensors;
    d) updating the dynamic model with the input field data; and
    e) calibrating the one or more wellbore sensors if the input field data exceeds the defined drift thresholds.

18. The method of claim 17, further comprising updating the dynamic model based on the calibrating of the one or more wellbore sensors.

19. A method for determining when to calibrate a wellbore sensor comprising:
    a) modeling drift thresholds for one or more wellbore sensors;
    b) collecting field data from the one or more wellbore sensors;
    c) comparing the collected field data to the drift thresholds;

d) recalibrating the one or more wellbore sensors if the collected field data exceeds the drift thresholds; and f) updating the drift thresholds modeling with the collected field data.

20. The method of claim 19, wherein said modelling drift thresholds uses machine learning techniques.

21. The method of claim 20, wherein said machine learning techniques are selected from a group comprising gradient boosted trees, random forest, and/or support vector machine.

* * * * *